United States Patent
Yang et al.

(10) Patent No.: US 11,996,515 B2
(45) Date of Patent: May 28, 2024

(54) LITHIUM-ION SECONDARY BATTERY, BATTERY MODULE, BATTERY PACK, AND POWER CONSUMPTION APPARATUS

(71) Applicant: CONTEMPORARY AMPEREX TECHNOLOGY CO., LIMITED, Ningde (CN)

(72) Inventors: Longfei Yang, Ningde (CN); Limei Yang, Ningde (CN); Xiaomei Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/338,543

(22) Filed: Jun. 21, 2023

(65) Prior Publication Data

US 2024/0079636 A1    Mar. 7, 2024

Related U.S. Application Data

(63) Continuation of application No. PCT/CN2022/070107, filed on Jan. 4, 2022.

(51) Int. Cl.
*H01M 10/0525* (2010.01)
*H01M 4/04* (2006.01)
(Continued)

(52) U.S. Cl.
CPC ..... *H01M 10/0525* (2013.01); *H01M 4/0404* (2013.01); *H01M 4/667* (2013.01);
(Continued)

(58) Field of Classification Search
CPC ......... H01M 10/0525; H01M 10/0569; H01M 10/0585; H01M 4/0404; H01M 4/667
See application file for complete search history.

(56) References Cited

U.S. PATENT DOCUMENTS

2018/0175440 A1   6/2018  Kwon et al.
2020/0266448 A1*  8/2020  Osada ............... H01M 10/0525
2021/0066687 A1*  3/2021  Que ..................... H01M 50/536

FOREIGN PATENT DOCUMENTS

CN    102110850 A    6/2011
CN    102306778 A    1/2012
CN    111653758 A    9/2020

OTHER PUBLICATIONS

The World Intellectual Property Organization (WIPO) International Search Report with Written Opinion for PCT/CN2022/070107 Aug. 25, 2022 19 pages (including English translation).

* cited by examiner

*Primary Examiner* — Christopher P Domone
*Assistant Examiner* — Jonathan William Estes
(74) *Attorney, Agent, or Firm* — ANOVA LAW GROUP, PLLC

(57) ABSTRACT

A lithium-ion secondary battery includes a negative electrode sheet including a negative electrode current collector and a negative electrode film disposed on a surface of the negative electrode current collector and containing a negative active material, a positive electrode sheet including a positive electrode current collector and a positive electrode film disposed on a surface of the positive electrode current collector and containing a positive active material, and an electrolytic solution including lithium iodide, a lithium salt, a solvent, and an additive. A coating weight per unit area, $CW_1/S_0$, of the positive electrode film satisfies $CW_1/S_0 = ((CW_2/S_0) \times b \times C_2/CB - m \times X \times (199 \text{ mAh/g})/S)/(C_1 \times a)$.

17 Claims, 5 Drawing Sheets

(51) Int. Cl.
  *H01M 4/66* (2006.01)
  *H01M 10/0567* (2010.01)
  *H01M 10/0568* (2010.01)
  *H01M 10/0569* (2010.01)
  *H01M 10/0585* (2010.01)
  *H01M 50/103* (2021.01)
(52) U.S. Cl.
  CPC ... *H01M 10/0567* (2013.01); *H01M 10/0568* (2013.01); *H01M 10/0569* (2013.01); *H01M 10/0585* (2013.01); *H01M 50/103* (2021.01); *H01M 2300/0094* (2013.01)

LITHIUM-ION SECONDARY BATTERY, BATTERY MODULE, BATTERY PACK, AND POWER CONSUMPTION APPARATUS

CROSS-REFERENCE TO RELATED APPLICATION

This application is a continuation of International Application No. PCT/CN2022/070107, filed on Jan. 4, 2022, the entire content of which is incorporated herein by reference.

TECHNICAL FIELD

The present application relates to the field of lithium battery technologies, and in particular, to a long-life lithium-ion secondary battery, a battery module, a battery pack, and a power consumption apparatus.

BACKGROUND

In recent years, with the wider application of lithium-ion batteries, the lithium-ion batteries are widely applied to energy storage power systems such as hydropower, firepower, wind power and solar power plants, as well as electric tools, electric bicycles, electric motorcycles, electric vehicles, military equipment, aerospace and other fields. Due to the great development of the lithium-ion batteries, higher requirements are put forward for their lifespans.

The main means for improving the life of a lithium-ion secondary battery in the related art are: types of positive active material and graphite with good cycle performance and storage performance are selected, the electrolyte formulation is optimized (by changing an organic solvent and an additive), formulations of a positive electrode film and a negative electrode film are optimized, film formation conditions of solid electrolyte interphase film (SEI film) are optimized, and the like. All of these means are considered from the viewpoint of suppressing side reactions at the negative electrode, the reduction of active lithium ions is delayed by means of "cutting expenses", and thus it merely plays a limited role. At present, a cycle life of a lithium-ion secondary battery may be up to about 5,000 to 6,000 times, and it is still far from a cycle life of more than 10,000 times of a long-life electric bus and large-scale energy storage system, which is a target cycle life of the lithium-ion secondary battery.

SUMMARY

The present application is made in view of the foregoing problems. The objective is to provide a long-life lithium-ion secondary battery having good cycle performance and high-temperature storage performance.

In order to achieve the foregoing objective, in a first aspect of the present application, a lithium-ion secondary battery is provided, including (1) a negative electrode sheet, including a negative electrode current collector and a negative electrode film that is disposed on a surface of the negative electrode current collector and contains a negative active material; (2) a positive electrode sheet, including a positive electrode current collector and a positive electrode film that is disposed on a surface of the positive electrode current collector and contains a positive active material; and (3) an electrolytic solution, including lithium iodide, a lithium salt, a solvent, and an additive; where a coating weight $CW_1$ of a specific area (1540.25 mm$^2$) of the positive electrode film and a weight percentage m of lithium iodide in the electrolytic solution satisfy the following formula (1):

$$CW_1 = (CW_2 \times b \times C_2/CB - m \times X \times (199 \text{ mAh/g}) \times S_0/S)/(C_1 \times a) \quad (1)$$

where
a is a weight percentage of the positive active material of the positive electrode film, based on a total weight of the positive electrode film;
$C_1$ is a gram capacity of the positive active material, mAh/g;
$CW_2$ is a coating weight of a specific area (1540.25 mm$^2$) of the negative electrode film, g;
b is a weight percentage of the negative active material of the negative electrode film, based on a total weight of the negative electrode film;
$C_2$ is a gram capacity of the negative active material, mAh/g;
m is a weight percentage of lithium iodide in the electrolytic solution, based on a total weight of the electrolytic solution;
X is a total weight of the electrolytic solution, g;
$S_0$ is a specific area in terms of 1540.25 mm$^2$;
S is an area of the positive electrode sheet, mm$^2$; and
CB is a ratio of a capacity of a negative electrode per unit area to an available capacity of a positive electrode per unit area.

Therefore, in the present disclosure, by adding a specific amount of lithium iodide to the electrolytic solution, the coating weight of the specific area (coating weight per unit area) of the positive electrode film is determined, so that the total amount of active lithium in the battery system is ensured from the source, thereby improving the cycle life and high-temperature storage performance of the battery.

In some embodiments, the weight percentage m of lithium iodide in the electrolytic solution is 1-10 wt %, based on the total weight of the electrolytic solution. Therefore, by controlling the amount of lithium iodide added to the system, the coating weight of the specific area of the positive electrode film of the secondary battery may be adjusted and controlled, thereby improving the cycle life and high-temperature storage performance of the battery.

In some embodiments, the weight percentage a of the positive active material of the positive electrode film of the secondary battery is 92-97%, in some embodiments, 94-96%, based on the total weight of the positive electrode film. As a result, the coating weight of the specific area of the positive electrode film of the secondary battery may be adjusted and controlled, thereby improving the cycle life and high-temperature storage performance of the battery.

In some embodiments, the coating weight $CW_2$ of the specific area of the negative electrode film is 0.140-0.170 g, in some embodiments, 0.150-0.160 g; and the weight percentage b of the negative active material of the negative electrode film is 92-96%, in some embodiments, 93-95%, based on the total weight of the negative electrode film. As a result, the coating weight of the specific area of the positive electrode film of the secondary battery may be adjusted and controlled, thereby improving the cycle life and high-temperature storage performance of the battery.

In some embodiments, the lithium salt is at least one selected from lithium bis(fluorosulfonyl)imide (LiFSI), lithium perchlorate, lithium hexafluorophosphate, lithium tetrafluoroborate, lithium hexafluoroarsenate, lithium tetrafluorooxalate phosphate, lithium bis(oxalate)borate, lithium trifluoromethanesulfonate, and lithium bis-(trifluoromethanesulfonyl)imide; in some embodiments, a content of the lithium salt is 1-15 wt %, based on a weight of the electrolytic solution. Thus, the specific type and content of lithium salts ensure the conductivity of the electrolytic solution, thereby improving the cycle life and high-temperature storage performance of the battery.

In some embodiments, the additive is one or more selected from vinylene carbonate (VC), ethylene sulfate (DTD), fluoroethylene carbonate (FEC), 1,3-propane cyclolactone (PS), and succinic anhydride (SA); in some embodiments, a content of the additive is 0-9 wt %, based on a weight of the electrolytic solution. As a result, a specific type of additive may promote the formation of a dense SEI film and prevent the electrolytic solution from being decomposed by oxidation-reduction during charge and discharge, thereby improving the cycle life and high-temperature storage performance of the battery.

In a second aspect of the present application, a battery module is provided, including the secondary in the first aspect of the present application.

In a third aspect of the present application, a battery pack is provided, including the battery module in the second aspect of the present application.

In a fourth aspect of the present application, a power consumption apparatus is provided including at least one selected from the secondary battery in the first aspect of the present application, the battery module in the second aspect or the battery pack in the third aspect of the present application.

In the present application, lithium iodide is added to the electrolytic solution, and the coating weight of a specific area of the positive electrode film is accurately controlled according to the amount of lithium iodide, which ensures the total amount of active lithium in the battery system, thereby improving the cycle life and high-temperature storage performance of the battery.

DESCRIPTION OF REFERENCE SIGNS

Figure 1:
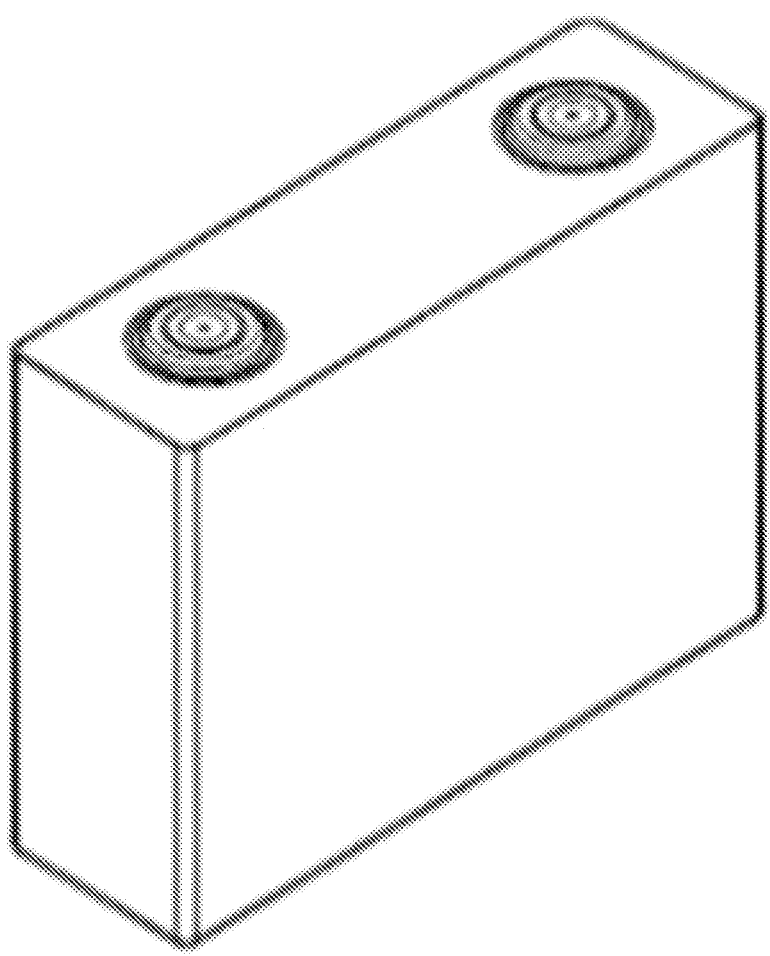
FIG. 1 is a schematic diagram of a secondary battery according to an embodiment of the present application.

1 battery pack; 2 upper box; 3 lower box; 4 battery module; 5 secondary battery; 51 housing; 52 electrode assembly; 53 top cover assembly

DESCRIPTION OF EMBODIMENTS

Hereinafter, embodiments that specifically disclose a lithium-ion secondary battery, a battery module, a battery pack, and a power consumption apparatus of the present application will be described in detail with reference to the accompanying drawings as appropriate. However, unnecessarily detailed descriptions may be omitted in some cases. For example, detailed descriptions of well-known matters and repeated descriptions of practically identical structures are omitted. This is done to avoid unnecessarily redundant descriptions for ease of understanding by persons skilled in the art. In addition, the drawings and the following description are provided for a full understanding of the present application by persons skilled in the art, and are not intended to limit the subject matter in the claims.

A "range" disclosed herein is defined in the form of a lower limit and an upper limit. A given range is defined by selecting a lower limit and an upper limit, and the selected lower limit and upper limit define a boundary of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer ≥2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but in some embodiments, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, "comprising" and "containing" mentioned in the present application are open-ended or closed-ended. For example, the "comprising" and "containing" may mean that other components that are not listed may further be comprised or contained, or only listed components may be comprised or contained.

In the present application, unless otherwise specified, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

Unless otherwise specified, in the present application, the term "specific area" represents an area with a size of 1540.25 $mm^2$, which is denoted as $S_0$. The coating weight and capacity of the positive and negative electrode films and corresponding amount of lithium iodide can be calculated based on a specific area of 1540.25 mm².

At present, the lithium-ion secondary battery is applied to various fields, with a huge amount of use, and has a higher requirement for its life. The main means for improving the life of a lithium-ion secondary battery in the related art are: types of positive active material and graphite with good cycle performance and storage performance are selected, the electrolyte formulation is optimized (by changing an organic solvent and an additive), formulations of a positive electrode film and a negative electrode film are optimized, film formation conditions of solid electrolyte interphase film (SEI film) are optimized, and the like. All of these means are considered from the viewpoint of suppressing side reactions at the negative electrode, the reduction of active lithium ions is delayed by means of "cutting expenses", and thus it merely plays a limited role. At present, there is still a big gap between a cycle life of a lithium-ion secondary battery and a cycle life of a long-life electric bus and large-scale energy storage system, which is a target cycle life of the lithium-ion secondary battery. After extensive research, the inventor found that according to the lithium-ion secondary battery of the first aspect of the present disclosure, the cycle performance and high-temperature storage performance of the secondary battery can be effectively improved by precisely controlling the amount of lithium iodide added in the electrolytic solution and the corresponding coating weight of the specific area of the positive electrode film.

Lithium-Ion Secondary Battery

In one embodiment of the present application, in a first aspect of the present application, a lithium-ion secondary battery is provided, including (1) a negative electrode sheet, including a negative electrode current collector and a negative electrode film that is disposed on a surface of the negative electrode current collector and contains a negative active material; (2) a positive electrode sheet, including a positive electrode current collector and a positive electrode film that is disposed on a surface of the positive electrode current collector and contains a positive active material; and (3) an electrolytic solution, including lithium iodide, a lithium salt, a solvent, and an additive; where a coating weight $CW_1$ of a specific area (1540.25 mm²) of the positive electrode film and a weight percentage m of lithium iodide in the electrolytic solution satisfy the following formula (1):

$$CW_1 = (CW_2 \times b \times C_2/CB - m \times X \times (199 \text{ mAh/g}) \times S_0/S)/(C_1 \times a) \quad (1)$$

where
a is a weight percentage of the positive active material of the positive electrode film, based on a total weight of the positive electrode film;
$C_1$ is a gram capacity of the positive active material, mAh/g;
$CW_2$ is a coating weight of a specific area (1540.25 mm²) of the negative electrode film, g;
b is a weight percentage of the negative active material of the negative electrode film, based on a total weight of the negative electrode film;
$C_2$ is a gram capacity of the negative active material, mAh/g;
m is a weight percentage of lithium iodide in the electrolytic solution, based on a total weight of the electrolytic solution;
X is a total weight of the electrolytic solution, g;
$S_0$ is a specific area in terms of 1540.25 mm²;
S is an area of the positive electrode sheet, mm²; and
CB is a ratio of a capacity of a negative electrode per unit area to an available capacity of a positive electrode per unit area.

Formula (1) can also be rewritten as:

$$CW_1/S_0 = ((CW_2/S_0) \times b \times C_2/CB - m \times X \times (199 \text{ mAh/g})/S)/(C_1 \times a)$$

where
$CW_1/S_0$ is a coating weight per unit area of the positive electrode film, g/mm²; and
$CW_2/S_0$ is a coating weight per unit area of the negative electrode film, g/mm².

Although the mechanism is not yet clear, the applicant unexpectedly found that: in the present application, by adding a specific amount of lithium iodide to the electrolytic solution, the coating weight of the specific area of the positive electrode film is determined, so that the total amount of active lithium in the battery system is ensured from the source, thereby improving the cycle life and high-temperature storage performance of the battery.

Generally, a secondary battery includes a positive electrode sheet, a negative electrode sheet, and an electrolytic solution. During charging and discharging of a battery, active ions are embedded and removed back and forth between the positive electrode sheet and the negative electrode sheet. The electrolytic solution plays a role of conducting ions between the positive electrode sheet and the negative electrode sheet.

[Electrolytic Solution]

An electrolytic solution plays the role of conducting ions between the positive electrode sheet and the negative electrode sheet. The type of the electrolytic solution is not specifically limited in the present application, and may be selected according to needs. For example, the electrolytic solution may be liquid, gel, or all-solid.

In some embodiments, the electrolytic solution is liquid. The electrolytic solution includes lithium iodide, a lithium salt, a solvent, and an additive.

In some embodiments, the weight percentage m of lithium iodide in the electrolytic solution is 1-10 wt %, in some embodiments 3-7 wt %, calculated based on the total weight of the electrolytic solution. Therefore, by controlling the amount of lithium iodide added to the system, the coating weight of the specific area of the positive electrode film of the secondary battery may be adjusted and controlled, thereby improving the cycle life and high-temperature storage performance of the battery.

In some embodiments, the lithium salt is at least one selected from lithium bis(fluorosulfonyl)imide (LiFSI), lithium perchlorate, lithium hexafluorophosphate, lithium tetrafluoroborate, lithium hexafluoroarsenate, lithium tetrafluorooxalate phosphate, lithium bis(oxalate)borate, lithium trifluoromethanesulfonate, and lithium bis-(trifluoromethanesulfonyl)imide; in some embodiments, a content of the lithium salt is 1-15 wt %, in some embodiments 9-13 wt %, based on a weight of the electrolyte. Thus, the specific type and content of lithium salts ensure the conductivity of the electrolytic solution, thereby improving the cycle life and high-temperature storage performance of the battery.

In some embodiments, the additive is one or more selected from vinylene carbonate (VC), ethylene sulfate (DTD), fluoroethylene carbonate (FEC), 1,3-propane cyclolactone (PS), and succinic anhydride (SA); in some embodiments, a content of the additive is 0-9 wt %, in some embodiments 3-5 wt %, based on a weight of the electrolyte. As a result, a specific type of additive may promote the formation of a dense SEI film and prevent the electrolytic solution from being decomposed by oxidation-reduction during charge and discharge, thereby improving the cycle life and high-temperature storage performance of the battery.

In some embodiments, the solvent may be selected from at least one of ethylene carbonate (EC), propylene carbonate (PC), ethyl methyl carbonate, diethyl carbonate, dimethyl carbonate (DMC), dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, or diethyl sulfone.

[Positive Electrode Sheet]

A positive electrode sheet includes a positive electrode current collector and a positive electrode film provided on at least one surface of the positive electrode current collector. As an example, the positive electrode current collector has two surfaces opposite in its own thickness direction, and the positive electrode film is disposed on either or both of the two opposite surfaces of the positive electrode current collector.

In some embodiments, the positive electrode current collector may be metal foil or a composite current collector. For example, as the metal foil, aluminum foil can be used. The composite current collector may include a polymer material base layer and a metal layer formed on at least one surface of the polymer material base layer. The composite current collector may be formed by synthesizing a metal material (aluminum, aluminum alloy, nickel, nickel alloy, titanium, titanium alloy, silver and silver alloy, or the like) on a polymer material substrate (such as a substrate of polypropylene (PP), polyethylene glycol terephthalate (PET), polybutylene terephthalate (PBT), polystyrene (PS), polyethylene (PE), or the like).

In some embodiments, the positive active material may be a positive active material for a battery known in the art. As an example, the positive active material may include at least one of the following materials: a lithium-containing phosphate of an olivine structure, a lithium transition metal oxide, and their respective modified compounds. However, the present application is not limited to these materials, and other conventional materials that can be used as a positive active material for a battery may also be used. One type of these positive active materials may be used alone, or two or more types thereof may be used in combination. Examples of the lithium transition metal oxide may include, but are not limited to, at least one of lithium cobalt oxides (such as $LiCoO_2$), lithium nickel oxides (such as $LiNiO_2$), lithium manganese oxides (such as $LiMnO_2$, $LiMn_2O_4$), lithium nickel cobalt oxides, lithium manganese cobalt oxides, lithium nickel manganese oxides, lithium nickel cobalt manganese oxides (such as $LiNi_{1/3}Co_{1/3}Mn_{1/3}O_2$ (or referred to as $NCM_{333}$ for short), $LiNi_{0.5}Co_{0.2}Mn_{0.3}O_2$ (or referred to as $NCM_{523}$ for short), $LiNi_{0.5}Co_{0.25}Mn_{0.25}O_2$ (or referred to as $NCM_{2n}$ for short), $LiNi_{0.6}Co_{0.2}Mn_{0.2}O_2$ (or referred to as $NCM_{622}$ for short), $LiNi_{0.8}Co_{0.1}Mn_{0.1}O_2$ (or referred to as $NCM_{811}$ for short)), lithium nickel cobalt aluminum oxides (such as $LiNi_{0.85}Co_{0.15}Al_{0.05}O_2$), their modified compounds, or the like. Examples of the lithium containing phosphate of the olivine structure may include, but are not limited to, at least one of lithium iron phosphate (such as $LiFePO_4$ (or referred to as LFP for short)), composite materials of lithium iron phosphate and carbon, lithium manganese phosphate (such as $LiMnPO_4$), composite materials of lithium manganese phosphate and carbon, lithium manganese iron phosphate, or composite materials of lithium manganese iron phosphate and carbon.

In some embodiments, the positive active material in the positive electrode film is selected from one or more of lithium iron phosphate, a ternary material, lithium manganate, and lithium cobaltate, and in some embodiments, the ternary material is selected from one or both of lithium nickel cobalt manganate and lithium nickel cobalt aluminate. Thus, the secondary battery of the present disclosure can be constructed, thereby improving the cycle life and high-temperature storage performance of the battery.

In some embodiments, the weight percentage a of the positive active material of the positive electrode film of the secondary battery is 92-97%, in some embodiments, 94-96%, based on the total weight of the positive electrode film. As a result, the coating weight of the specific area of the positive electrode film of the secondary battery may be adjusted and controlled, thereby improving the cycle life and high-temperature storage performance of the battery.

In some embodiments, the positive electrode film further in some embodiments includes a binder. As an example, the binder may include at least one of a polyvinylidene fluoride (PVDF), a polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, or fluorine-containing acrylate resin.

In some embodiments, the positive electrode film further in some embodiments includes a conductive agent. As an example, the conductive agent may include at least one of superconducting carbon, acetylene black, carbon black, Ketjen black, carbon dots, carbon nanotubes, graphene, or carbon nanofibers.

In some embodiments, the positive electrode sheet may be prepared in the following manner. The foregoing components for preparing the positive electrode sheet such as the positive active material, the conductive agent, the binder, and any other components are dispersed in a solvent (such as N-methylpyrrolidone), to form a positive electrode slurry, the positive electrode slurry is coated on the positive electrode current collector, and then after drying, cold pressing and other processes, a positive electrode sheet may be obtained.

[Negative Electrode Sheet]

A negative electrode sheet includes a negative electrode current collector and a negative electrode film disposed on at least one surface of the negative electrode current collector, and the negative electrode film includes a negative active material.

As an example, the negative electrode current collector has two surfaces opposite in its own thickness direction, and the negative electrode film is disposed on either or both of the two opposite surfaces of the negative electrode current collector.

In some embodiments, the negative electrode current collector may be metal foil or a composite current collector. For example, as the metal foil, copper foil may be used. The composite current collector may include a polymer material base layer and a metal layer formed on at least one surface of the polymer material substrate. The composite current collector may be formed by synthesizing a metal material (copper, copper alloy, nickel, nickel alloy, titanium, titanium alloy, silver and silver alloy, or the like) on a polymer material substrate (such as a substrate of polypropylene (PP), polyethylene glycol terephthalate (PET), polybutylene terephthalate (PBT), polystyrene (PS), polyethylene (PE), or the like).

In some embodiments, the negative active material may employ a negative active material for a battery known in the art. As an example, the negative active material may include at least one of artificial graphite, natural graphite, soft carbon, hard carbon, silicon-based materials, tin-based materials, lithium titanate, or the like. The silicon-based material may be selected from at least one of elemental silicon, silicon-oxygen compounds, silicon-carbon composites, silicon-nitrogen composites, or silicon alloys. The tin-based material may be selected from at least one of elemental tin, tin oxide compounds, or tin alloys. However, the present application is not limited to these materials, and other conventional materials that can be used as a negative active material for a battery may also be used. One type of these negative active materials may be used alone, or two or more types thereof may be used in combination.

In some embodiments, the coating weight $CW_2$ of the specific area of the negative electrode film is 0.140-0.170 g, in some embodiments, 0.150-0.160 g; and the weight percentage b of the negative active material of the negative electrode film is 92-96%, in some embodiments, 93%-95%, based on the total weight of the negative electrode film. As a result, the coating weight of the specific area of the positive electrode film of the secondary battery may be adjusted and controlled, thereby improving the cycle life and high-temperature storage performance of the battery.

In some embodiments, the negative electrode film further in some embodiments includes a binder. The binder may be selected from at least one of styrene-butadiene rubber (SBR), polyacrylic acid (PAA), polyacrylate sodium (PAAS), polyacrylamide (PAM), polyvinyl alcohol (PVA), sodium alginate (SA), polymethacrylic acid (PMAA), or carboxymethyl chitosan (CMCS).

In some embodiments, the negative electrode film further in some embodiments includes a conductive agent. The conductive agent may be selected from at least one of superconducting carbon, acetylene black, carbon black, Ketjen black, carbon dots, carbon nanotubes, graphene, or carbon nanofibers.

In some embodiments, the negative electrode film further in some embodiments includes other adjuvants, for example, thickening agents (such as sodium carboxymethyl cellulose (CMC-Na)), or the like.

In some embodiments, the negative electrode sheet may be prepared in the following manner. The foregoing components for preparing the negative electrode sheet such as the negative active material, the conductive agent, the binder, and any other components are dispersed in a solvent (such as deionized water), to form a negative electrode slurry, the negative electrode slurry is coated on the negative electrode current collector, and then after drying, cold pressing and other processes, a negative electrode sheet may be obtained.

[Separator]

In some embodiments, the secondary battery further includes a separator. The separator is disposed between the positive electrode sheet and the negative electrode sheet, which mainly plays the role of preventing a short circuit between the positive and negative electrodes while allowing ions to pass through. The type of the separator is not particularly limited in the present application, and any well-known porous structure separator with good chemical stability and mechanical stability may be selected.

In some embodiments, the material of the separator may be selected from at least one of glass fiber, non-woven fabric, polyethylene, polypropylene, or polyvinylidene difluoride. The separator may be a single-layer film or a multi-layer composite film, which is not particularly limited. When the separator is a multi-layer composite film, the materials of each layer may be the same or different, which is not particularly limited.

In some embodiments, the positive electrode sheet, the negative electrode sheet, and the separator may be subject to a winding process or a lamination process, to obtain an electrode assembly.

In some embodiments, the secondary battery may include an outer package. The outer package may be used to package the foregoing electrode assembly and electrolytic solution.

In some embodiments, the outer package of the secondary battery may be a hard shell such as a hard plastic shell, an aluminum shell, or a steel shell. In some embodiments, the outer package of the battery cell may be a soft package, such as a bag-type soft package. A material of the soft package may be plastic, for example, polypropylene, polybutylene terephthalate, and polybutylene succinate.

The present application has no particular limitation on the shape of the secondary battery, which may be a cylinder, a square, or any other shape. For example, FIG. 1 shows a secondary battery 5 of a square structure as an example.

Figure 2:
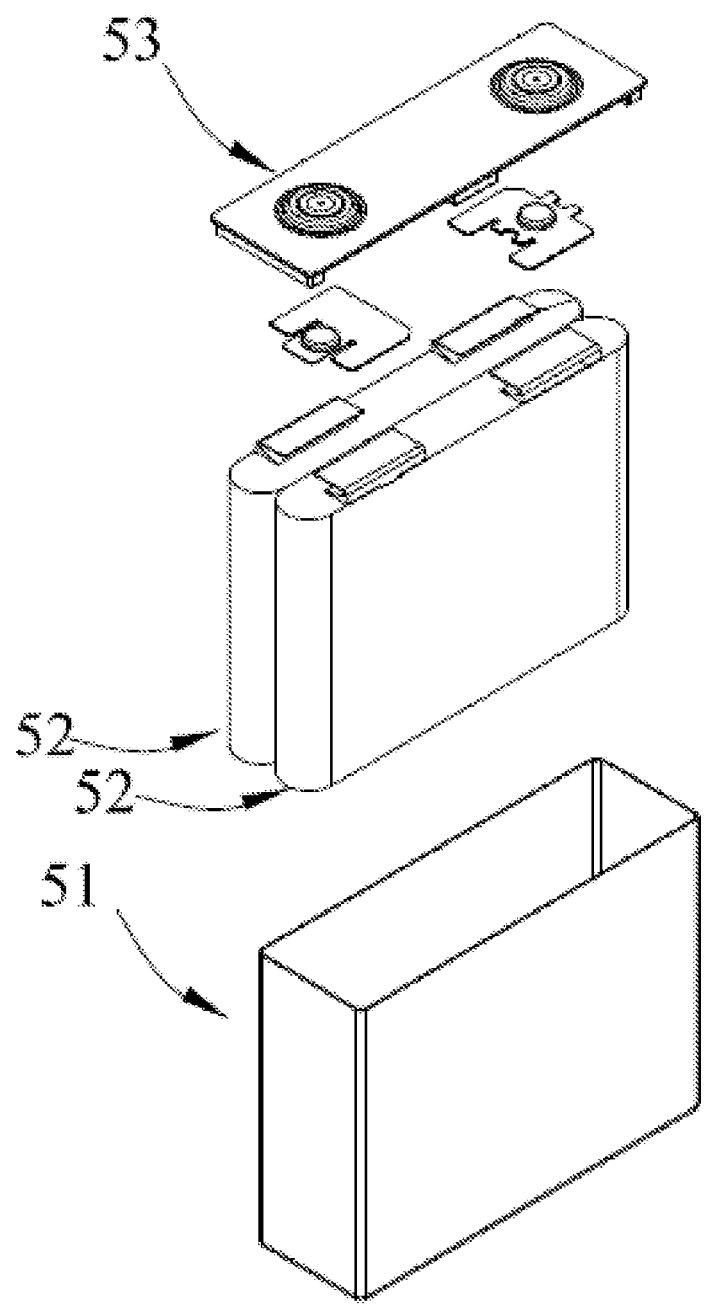
FIG. 2 is an exploded view of the secondary battery according to the embodiment of the present application shown in FIG. 1.

In some embodiments, referring to FIG. 2, the outer package may include a housing 51 and a cover plate 53. The housing 51 may include a bottom plate and a side plate connected to the bottom plate. The bottom plate and the side plate are enclosed to form an accommodating cavity. The housing 51 has an opening communicating with the accommodating cavity, and the cover plate 53 can cover the opening to close the accommodating cavity. A positive electrode sheet, a negative electrode sheet, and a separator may be subject to a winding process or a lamination process to form an electrode assembly 52. The electrode assembly 52 is packaged in the accommodating cavity. The electrolytic solution is infiltrated in the electrode assembly 52. The number of electrode assemblies 52 included in the secondary battery 5 may be one or more, and the specific number may be selected by persons skilled in the art according to specific actual needs.

In some embodiments, secondary batteries may be assembled into a battery module, and the number of secondary batteries included in the battery module may include one or more, and the specific number may be selected by persons skilled in the art according to application and capacity of the battery module.

Figure 3:
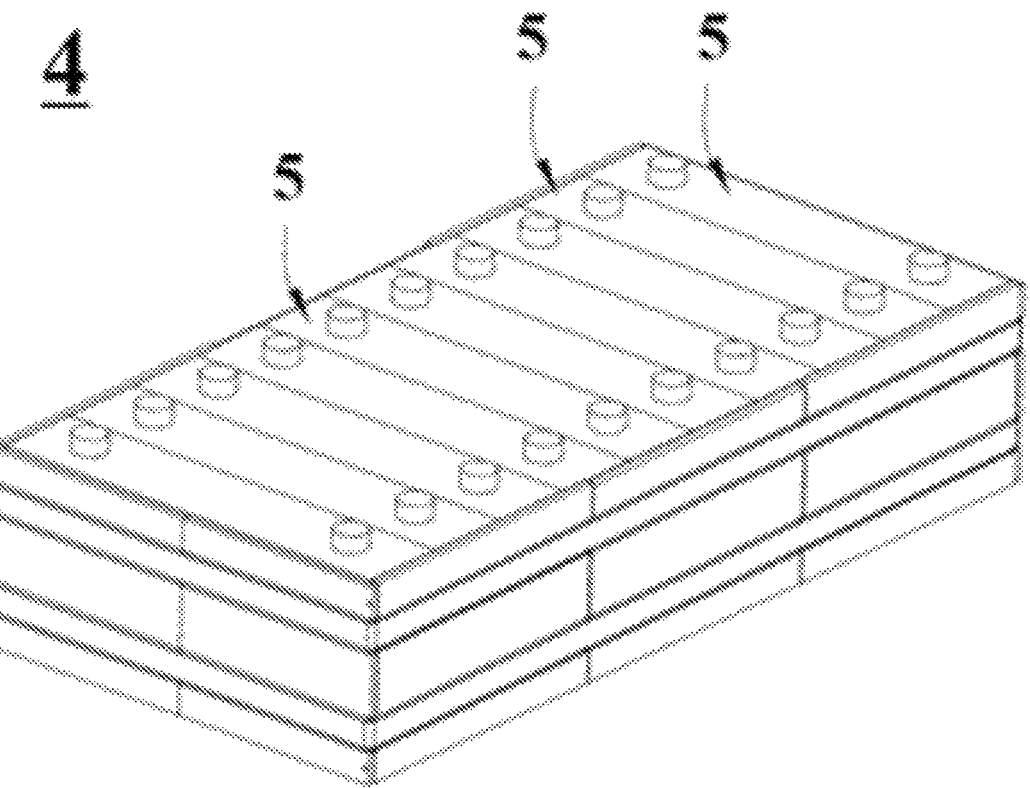
FIG. 3 is a schematic diagram of a battery module according to an embodiment of the present application.

FIG. 3 shows a battery module 4 as an example. Referring to FIG. 3, in the battery module 4, a plurality of secondary batteries 5 may be sequentially arranged along a length direction of the battery module 4. Certainly, they may be arranged in accordance with any other manner. Further, the plurality of secondary batteries 5 may be fixed by using fasteners.

In some embodiments, the battery module 4 may further include a shell with an accommodating space, and the plurality of secondary batteries 5 are accommodated in the accommodating space.

In some embodiments, battery modules may be further assembled into a battery pack, and the number of battery modules included in the battery pack may be one or more, and the specific number may be selected by persons skilled in the art according to application and capacity of the battery pack.

Figure 4:
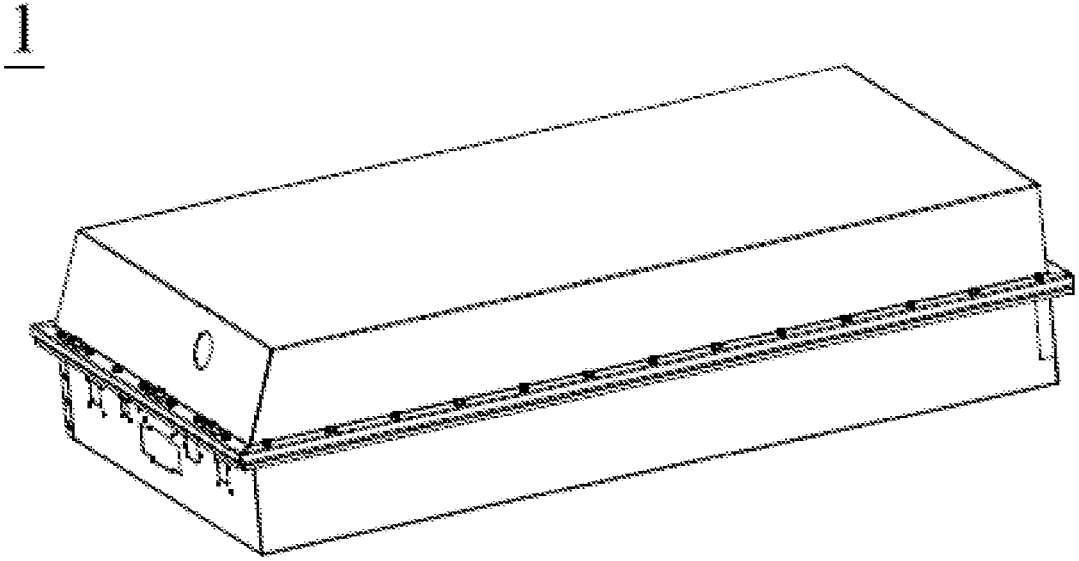
FIG. 4 is a schematic diagram of a battery pack according to an embodiment of the present application.
Figure 5:
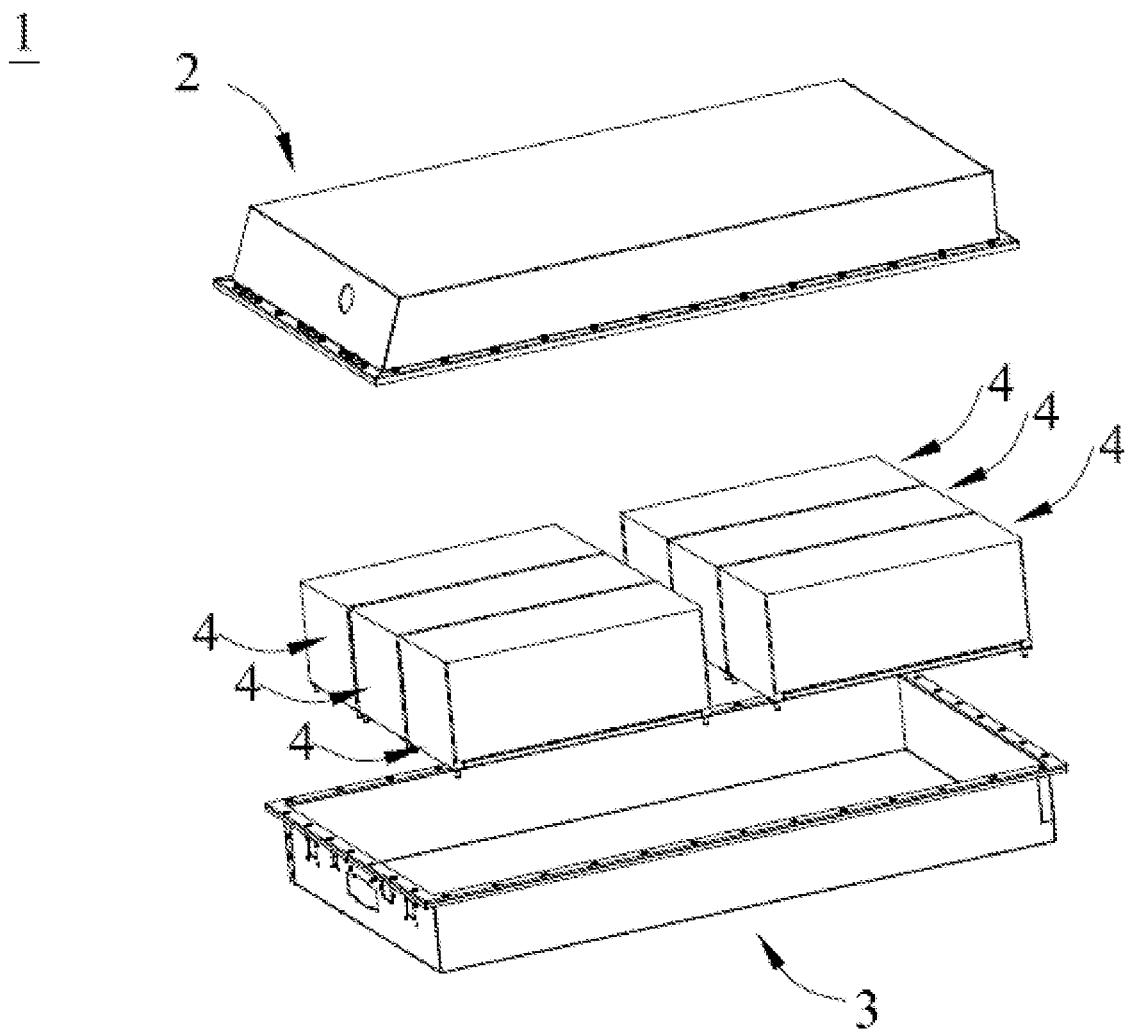
FIG. 5 is an exploded view of the battery pack according to the embodiment of the present application shown in FIG. 4.

FIG. 4 and FIG. 5 show a battery pack 1 as an example. Referring to FIG. 4 and FIG. 5, the battery pack 1 may include a battery box and a plurality of battery modules 4 disposed in the battery box. The battery box includes an upper box 2 and a lower box 3. The upper box 2 can cover the lower box 3 and form an enclosed space for accommodating the battery modules 4. The plurality of battery modules 4 may be arranged in the battery box in any manner.

In addition, the present application also provides a power consumption apparatus including at least one of a secondary battery, a battery module, or a battery pack provided in the present application. The secondary battery, battery module, or battery pack may be used as a power source for the power consumption apparatus as well as an energy storage unit for the power consumption apparatus. The power consumption apparatus may include a mobile device (for example, a mobile phone, a notebook computer), an electric vehicle (for example, a pure electric vehicle, a hybrid electric vehicle, a plug-in hybrid electric vehicle, an electric bicycle, an electric scooter, an electric golf cart, an electric truck), an electric train, a ship and a satellite, an energy storage system, or the like, but is not limited to this.

As the power consumption apparatus, a secondary battery, a battery module, or a battery pack may be selected according to usage requirements.

Figure 6:
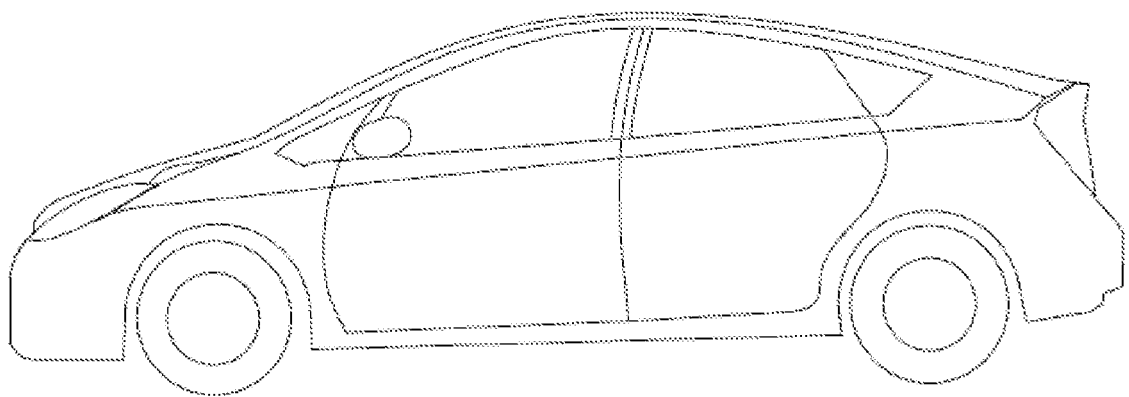
FIG. 6 is a schematic diagram of a power consumption apparatus in which a secondary battery is used as a power source according to an embodiment of the present application.

FIG. 6 shows a power consumption apparatus as an example. The power consumption apparatus is a pure electric vehicle, a hybrid electric vehicle, a plug-in hybrid electric vehicle, or the like. To meet a requirement of the power consumption apparatus for high power and high energy density of a secondary battery, a battery pack or a battery module may be used.

In another example, the apparatus may be a mobile phone, a tablet computer, a notebook computer, or the like. The apparatus usually requires lightness and thinness, and a secondary battery may be used as a power source.

EXAMPLES

Hereinafter, examples of the present application will be described. The examples described below are illustrative, only used to explain the present application, and should not be construed as a limitation to the present application. Where specific techniques or conditions are not specified in the examples, they are performed according to techniques or conditions described in the literature in the art or according to product specifications. The reagents or instruments used without specifying the manufacturer are conventional products that can be obtained from the market.

Example 1

(1) Preparation of Electrolytic Solution

In an argon atmosphere glove box with a water content of less than 10 ppm, EC, PC, and DMC were mixed in a weight ratio of EC:PC:DMC=3:3:3 to obtain a mixed organic solvent; and then lithium iodide, lithium bis(fluorosulfonyl) imide (LiFSI) and VC were added to the mixed organic solvent, and after stirring uniformly, an electrolytic solution was obtained, where the concentration of LiFSI was 1 mol/L, the weight percentage of VC was 5 wt %, and the weight percentage m of lithium iodide was 1 wt %; and the above weight percentages were all calculated based on the total weight of the electrolytic solution.

(2) Preparation of Negative Electrode Sheet

A negative active material artificial graphite (having a gram capacity $C_2$ of 372 mAh/g), a conductive agent acetylene black, and a binder SBR+CMC were mixed in a weight ratio of 95:1.5:3.1:0.4, a solvent deionized water was added, and after fully stirring and uniformly mixing, a negative electrode slurry was obtained; and then the slurry was coated on both surfaces of copper foil of the negative electrode current collector, where the coating weight $CW_2$ of the specific area of the negative electrode film is 0.140 g/1540.25 mm$^2$ (calculated based on the weight not including the solvent), and then after drying and cold pressing, a negative electrode sheet was obtained.

(3) Preparation of the Positive Electrode Plate

Lithium iron phosphate (having a gram capacity C1 of 160 mAh/g) was used as a positive active material, and the weight percentage a of the positive active material of the positive electrode film was set to be 95 wt %, based on a total weight of the positive electrode film; a total weight X of the electrolytic solution added to the battery is 0.5 g; an area S of the positive electrode sheet was set to be 2079 mm$^2$; CB was 1.2; then according to $$CW_1=(CW_2{\times}b{\times}C_2/CB-m{\times}X{\times}(199\ \text{mAh/g}){\times}S_0/S)/(C1{\times}a)$$

the coating weight $CW_1$ of the unit area (1540.25 mm$^2$) of the positive electrode film was calculated to be 0.266 g/1540.25 mm$^2$.

A positive active material lithium iron phosphate (having a gram capacity $C_1$ is 160 mAh/g), a conductive agent acetylene black, and a binder PVDF were mixed in a weight ratio of 95:4:1, a solvent N-methylpyrrolidone was added, and after fully stirring and uniformly mixing, a positive electrode slurry was obtained, and then the slurry was coated on both surfaces of aluminum foil of the positive electrode current collector according to the coating weight calculated above, and then after drying and cold pressing, a positive electrode sheet was obtained.

(4) Preparation of Separator

A polyethylene porous film was used as the separator.

(5) Preparation of Lithium-Ion Secondary Battery

The positive electrode sheet, the separator, and the negative electrode sheet were stacked in order, so that the separator was placed between the positive and negative electrode sheets to play a role of isolation, and then they were wound to obtain a bare cell. The bare cell was placed in an outer package, and the electrolytic solution was injected and encapsulation was performed to obtain a lithium-ion secondary battery.

Examples 2-23

The same steps as in Example 1 were carried out except that the concentration of lithium iodide in the electrolytic solution, the type and content of additives in the electrolytic solution, the type and weight percentage of the positive active material, the type and weight percentage of the negative active material, and the coating weight of the unit area of the negative electrode film were changed. The specific parameters are summarized in Table 1.

Comparative Example 1

The same steps as in Example 1 were carried out, except that the electrolytic solution did not contain lithium iodide.

The relevant parameters for Comparative Example 1 above are summarized in Table 1.

TABLE 1

Parameter Results for Examples 1-23 and Comparative Example 1

| Serial Number of Example | Positive Active Material Type | wt % | Lithium Iodide wt % | Additive Type | wt % | Negative Active Material Type | wt % | Coating Weight at Negative Electrode/ G |
|---|---|---|---|---|---|---|---|---|
| 1 | Lithium Iron Phosphate | 95 | 1 | VC | 5 | Artificial Graphite | 95 | 0.140 |
| 2 | Lithium Iron Phosphate | 95 | 3 | VC | 5 | Artificial Graphite | 95 | 0.140 |
| 3 | Lithium Iron Phosphate | 95 | 6 | VC | 5 | Artificial Graphite | 95 | 0.140 |
| 4 | Lithium Iron Phosphate | 95 | 7 | VC | 5 | Artificial Graphite | 95 | 0.140 |
| 5 | Lithium Iron Phosphate | 95 | 10 | VC | 5 | Artificial Graphite | 95 | 0.140 |
| 6 | NCM333 | 95 | 1 | VC | 5 | Artificial Graphite | 95 | 0.140 |
| 7 | NCM811 | 95 | 1 | VC | 5 | Artificial Graphite | 95 | 0.140 |
| 8 | Lithium Iron Phosphate | 92 | 1 | VC | 5 | Artificial Graphite | 95 | 0.140 |
| 9 | Lithium Iron Phosphate | 98 | 1 | VC | 5 | Artificial Graphite | 95 | 0.140 |
| 10 | Lithium Iron Phosphate | 96 | 1 | VC | 5 | Artificial Graphite | 95 | 0.140 |
| 11 | Lithium Iron Phosphate | 95 | 1 | VC + FEC | 2% + 1% | Artificial Graphite | 95 | 0.140 |
| 12 | Lithium Iron Phosphate | 95 | 1 | VC + FEC + DTD | 2% + 0.5% + 0.5% | Artificial Graphite | 95 | 0.140 |
| 13 | Lithium Iron Phosphate | 95 | 1 | VC + FEC + DTD | 2% + 1% + 1% | Artificial Graphite | 95 | 0.140 |
| 14 | Lithium Iron Phosphate | 95 | 1 | VC + FEC + DTD + PS | 2% + 1% + 1% + 0.2% | Artificial Graphite | 95 | 0.140 |
| 15 | Lithium Iron Phosphate | 95 | 1 | VC + FEC + DTD + PS | 2% + 1% + 1% + 0.5% | Artificial Graphite | 95 | 0.140 |
| 16 | Lithium Iron Phosphate | 95 | 1 | VC | 5 | Natural Graphite | 95 | 0.140 |
| 17 | Lithium Iron Phosphate | 95 | 1 | VC | 5 | Soft Carbon | 95 | 0.140 |
| 18 | Lithium Iron Phosphate | 95 | 1 | VC | 5 | Hard Carbon | 95 | 0.140 |
| 19 | Lithium Iron Phosphate | 95 | 1 | VC | 5 | Artificial Graphite | 92 | 0.140 |
| 20 | Lithium Iron Phosphate | 95 | 1 | VC | 5 | Artificial Graphite | 93 | 0.140 |
| 21 | Lithium Iron Phosphate | 95 | 1 | VC | 5 | Artificial Graphite | 95 | 0.150 |
| 22 | Lithium Iron Phosphate | 95 | 1 | VC | 5 | Artificial Graphite | 95 | 0.160 |
| 23 | Lithium Iron Phosphate | 95 | 1 | VC | 5 | Artificial Graphite | 95 | 0.170 |

TABLE 1-continued

Parameter Results for Examples 1-23 and Comparative Example 1

| Serial Number of Example | Positive Active Material Type | wt % | Lithium Iodide wt % | Additive Type | wt % | Negative Active Material Type | wt % | Coating Weight at Negative Electrode/ G |
|---|---|---|---|---|---|---|---|---|
| Comparative Example 1 | Lithium Iron Phosphate | 95 | Not Included | VC | 5 | Artificial Graphite | 95 | 0.140 |

Performance Test

The secondary batteries obtained in the above Examples 1-23 and Comparative Example 1 were subjected to performance tests. The test results are shown in Table 2 below.

1. Cycle Performance Test of Secondary Battery at 60° C.

The battery cell was placed in a constant temperature 60° C. incubator, performed cycling at a test rate of 1C/1C, and a ratio of a capacity after 500 cycles to a capacity of the first cycle was used to calculate a cycle capacity retention rate.

(2) Storage Capacity Retention Rate Test of Secondary Battery at 60° C.

Firstly, a capacity of the battery cell before storage was tested, then the battery cell was adjusted to 100% SOC, and then was placed in a constant temperature 60° C. incubator; after storage for 90 days, the battery cell was taken out of the incubator, placed it in a normal temperature environment to test a capacity after storage, and a ratio of the capacity after storage to the capacity before storage was calculated, which was a storage capacity retention rate.

TABLE 2

Performance Test of Secondary Battery of Examples 1-23 and Comparative Example 1

| Serial Number | Cycle Capacity Retention Rate After 500 Cycles at 60° C. | Storage Capacity Retention Rate After 90 Days at 60° C. |
|---|---|---|
| Example 1 | 93 | 95.2 |
| Example 2 | 96.4 | 97.1 |
| Example 3 | 97.3 | 98.2 |
| Example 4 | 95.8 | 96.3 |
| Example 5 | 94.1 | 95.1 |
| Example 6 | 94.2 | 94.9 |
| Example 7 | 93.9 | 95.7 |
| Example 8 | 92.4 | 94.8 |
| Example 9 | 91.9 | 94.2 |
| Example 10 | 93.4 | 95.4 |
| Example 11 | 93.6 | 95.3 |
| Example 12 | 94.1 | 95.8 |
| Example 13 | 94.5 | 95.6 |
| Example 14 | 94.3 | 95.9 |
| Example 15 | 94.8 | 96.2 |
| Example 16 | 93.2 | 95 |
| Example 17 | 92.1 | 94.2 |
| Example 18 | 93.7 | 94.7 |
| Example 19 | 92.4 | 95.5 |
| Example 20 | 93.5 | 95.1 |
| Example 21 | 93.3 | 96.1 |
| Example 22 | 93.8 | 96.3 |
| Example 23 | 93.9 | 95.9 |
| Comparative Example 1 | 91 | 93.9 |

It can be seen from the above results that in Examples 1-23, by adding lithium iodide to the electrolytic solution, the cycle retention rate of the secondary battery was maintained at 91.9% or more, and the storage capacity retention rate was maintained at 94% or more.

In contrast, in Comparative Example 1, lithium iodide was not added, the cycle retention rate and storage capacity retention rate of the secondary battery were not as good as those of the Examples of the present disclosure.

It should be noted that the present application is not limited to the foregoing embodiments. The foregoing embodiments are merely examples, and embodiments having substantially the same constitution as the technical idea and exerting the same effects within the technical solution of the present application are all included within the technical scope of the present application. In addition, various modifications may be made to the embodiments by persons skilled in the art without departing from the spirit and scope of the present application, and other embodiments that are constructed by combining some of the constituent elements of the embodiments are also included in the scope of the present application.

What is claimed is:

1. A lithium-ion secondary battery, comprising:
   a negative electrode sheet, comprising a negative electrode current collector and a negative electrode film that is disposed on a surface of the negative electrode current collector and contains a negative active material;
   a positive electrode sheet, comprising a positive electrode current collector and a positive electrode film that is disposed on a surface of the positive electrode current collector and contains a positive active material; and
   an electrolytic solution, comprising lithium iodide, a lithium salt, a solvent, and an additive;
   wherein a coating weight $CW_1$ of a specific area (1540.25 mm$^2$) of the positive electrode film satisfies the following formula:

$$CW_1 = (CW_2 \times b \times C_2/CB - m \times X \times (199 \text{ mAh/g}) \times S_0/S)/(C_1 \times a)$$

wherein:
   a is a weight percentage of the positive active material of the positive electrode film, based on a total weight of the positive electrode film;
   $C_1$ is a gram capacity of the positive active material, mAh/g;
   $CW_2$ is a coating weight of a specific area (1540.25 mm$^2$) of the negative electrode film, g;
   b is a weight percentage of the negative active material of the negative electrode film, based on a total weight of the negative electrode film;
   $C_2$ is a gram capacity of the negative active material, mAh/g;
   m is a weight percentage of lithium iodide in the electrolytic solution, based on a total weight of the electrolytic solution;
   X is a total weight of the electrolytic solution, g;

$S_0$ is a specific area in terms of 1540.25 mm$^2$;

S is an area of the positive electrode sheet, mm$^2$; and

CB is a ratio of a capacity of a negative electrode of a specific area to an available capacity of a positive electrode of a specific area.

2. The secondary battery according to claim 1, wherein the weight percentage m of lithium iodide in the electrolytic solution is 1-10 wt %, based on the total weight of the electrolytic solution.

3. The secondary battery according to claim 1, wherein: the weight percentage a of the positive active material of the positive electrode film is 92-97%, based on the total weight of the positive electrode film.

4. The secondary battery according to claim 3, wherein: the weight percentage a of the positive active material of the positive electrode film is 94-96%, based on the total weight of the positive electrode film.

5. The secondary battery according to claim 1, wherein the coating weight $CW_2$ of the specific area of the negative electrode film is 0.140 to 0.170 g.

6. The secondary battery according to claim 5, wherein the coating weight $CW_2$ of the specific area of the negative electrode film is 0.150 to 0.160 g.

7. The secondary battery according to claim 1, wherein the weight percentage b of the negative active material of the negative electrode film is 92-96%, based on the total weight of the negative electrode film.

8. The secondary battery according to claim 1, wherein the weight percentage b of the negative active material of the negative electrode film is 93-95%, based on the total weight of the negative electrode film.

9. The secondary battery according to claim 1, wherein the lithium salt is at least one selected from lithium bis(fluorosulfonyl)imide (LiFSI), lithium perchlorate, lithium hexafluorophosphate, lithium tetrafluoroborate, lithium hexafluoroarsenate, lithium tetrafluorooxalate phosphate, lithium bis(oxalate)borate, lithium trifluoromethanesulfonate, and lithium bis-(trifluoromethanesulfonyl)imide.

10. The secondary battery according to claim 1, wherein a content of the lithium salt is 1-15 wt %, based on a weight of the electrolytic solution.

11. The secondary battery according to claim 1, wherein the additive is one or more selected from vinylene carbonate, ethylene sulfate, fluoroethylene carbonate, 1,3-propane cyclolactone, and succinic anhydride.

12. The secondary battery according to claim 1, wherein a content of the additive is 0-9 wt %, based on a weight of the electrolytic solution.

13. A power consumption apparatus, comprising the second battery according to claim 1.

14. A battery module, comprising:
a lithium-ion secondary battery, comprising:
a negative electrode sheet, comprising a negative electrode current collector and a negative electrode film that is disposed on a surface of the negative electrode current collector and contains a negative active material;
a positive electrode sheet, comprising a positive electrode current collector and a positive electrode film that is disposed on a surface of the positive electrode current collector and contains a positive active material; and
an electrolytic solution, comprising lithium iodide, a lithium salt, a solvent, and an additive;

wherein a coating weight $CW_1$ of a specific area (1540.25 mm$^2$) of the positive electrode film satisfies the following formula:

$$CW_1 = (CW_2 \times b \times C_2/CB - m \times X \times (199\ \text{mAh/g}) \times S_0/S)/(C_1 \times a)$$

wherein:
a is a weight percentage of the positive active material of the positive electrode film, based on a total weight of the positive electrode film;

$C_1$ is a gram capacity of the positive active material, mAh/g;

$CW_2$ is a coating weight of a specific area (1540.25 mm$^2$) of the negative electrode film, g;

b is a weight percentage of the negative active material of the negative electrode film, based on a total weight of the negative electrode film;

$C_2$ is a gram capacity of the negative active material, mAh/g;

m is a weight percentage of lithium iodide in the electrolytic solution, based on a total weight of the electrolytic solution;

X is a total weight of the electrolytic solution, g;

$S_0$ is a specific area in terms of 1540.25 mm$^2$;

S is an area of the positive electrode sheet, mm$^2$; and

CB is a ratio of a capacity of a negative electrode of a specific area to an available capacity of a positive electrode of a specific area.

15. A power consumption apparatus, comprising the battery module according to claim 14.

16. A battery pack, comprising:
a battery module comprising a lithium-ion secondary battery, the lithium-ion secondary battery comprising:
a negative electrode sheet, comprising a negative electrode current collector and a negative electrode film that is disposed on a surface of the negative electrode current collector and contains a negative active material;
a positive electrode sheet, comprising a positive electrode current collector and a positive electrode film that is disposed on a surface of the positive electrode current collector and contains a positive active material; and
an electrolytic solution, comprising lithium iodide, a lithium salt, a solvent, and an additive;
wherein a coating weight $CW_1$ of a specific area (1540.25 mm$^2$) of the positive electrode film satisfies the following formula:

$$CW_1 = (CW_2 \times b \times C_2/CB - m \times X \times (199\ \text{mAh/g}) \times S_0/S)/(C_1 \times a)$$

wherein:
a is a weight percentage of the positive active material of the positive electrode film, based on a total weight of the positive electrode film;

$C_1$ is a gram capacity of the positive active material, mAh/g;

$CW_2$ is a coating weight of a specific area (1540.25 mm$^2$) of the negative electrode film, g;

b is a weight percentage of the negative active material of the negative electrode film, based on a total weight of the negative electrode film;

$C_2$ is a gram capacity of the negative active material, mAh/g;

m is a weight percentage of lithium iodide in the electrolytic solution, based on a total weight of the electrolytic solution;

X is a total weight of the electrolytic solution, g;
$S_0$ is a specific area in terms of 1540.25 mm$^2$;
S is an area of the positive electrode sheet, mm$^2$; and
CB is a ratio of a capacity of a negative electrode of a specific area to an available capacity of a positive electrode of a specific area.

17. A power consumption apparatus, comprising the battery pack according to claim 16.

* * * * *